US008001788B2

(12) United States Patent
Martin et al.

(10) Patent No.: US 8,001,788 B2
(45) Date of Patent: Aug. 23, 2011

(54) METHOD AND APPARATUS FOR PREPARING PULVERIZED COAL USED TO PRODUCE SYNTHESIS GAS

(75) Inventors: William N. Martin, Brecksville, OH (US); Todd M. Sommer, Dalton, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 813 days.

(21) Appl. No.: 12/060,459

(22) Filed: Apr. 1, 2008

(65) Prior Publication Data

US 2008/0245076 A1    Oct. 9, 2008

(51) Int. Cl.
*F02C 3/00* (2006.01)

(52) U.S. Cl. .......................................... 60/781; 60/39.12
(58) Field of Classification Search ................ 60/781, 60/39.12, 39.182, 39.464, 39.52
See application file for complete search history.

(56) References Cited

U.S. PATENT DOCUMENTS 4,976,101 A * 12/1990 Schiffers ...................... 60/39.12

* cited by examiner

*Primary Examiner* — Ehud Gartenberg
*Assistant Examiner* — Vikansha Dwivedi
(74) *Attorney, Agent, or Firm* — Eric Marich

(57) ABSTRACT

A method and apparatus for preparing pulverized coal used in the production of synthesis gas combusted in gas turbines used in integrated gasification combined cycle power plants uses gas turbine exhaust gas to dry and convey pulverized coal from a pulverizer to a coal/gas separation device.

6 Claims, 1 Drawing Sheet

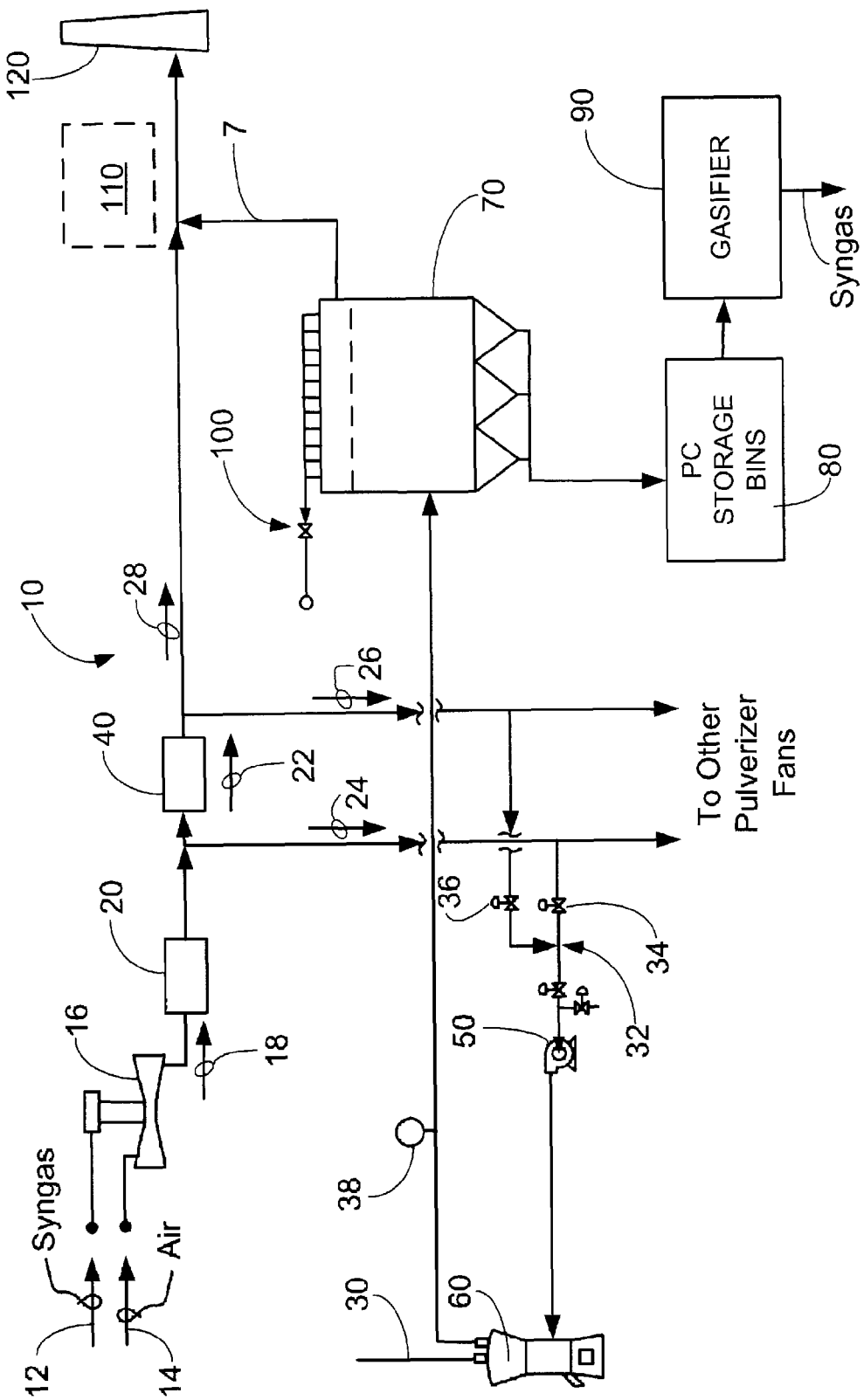

1

METHOD AND APPARATUS FOR PREPARING PULVERIZED COAL USED TO PRODUCE SYNTHESIS GAS

FIELD AND BACKGROUND OF THE INVENTION

The present invention relates generally to pulverized coal preparation and, in particular, to a method and apparatus for preparing pulverized coal used in the production of synthesis gas combusted in gas turbines used in integrated gasification combined cycle power plants.

Integrated gasification combined cycle (IGCC) power plants produce synthesis gas fuel in gasifiers via the partial combustion of coal. The synthesis gas is used as fuel for gas turbines of these IGCC power plants.

The coal used to produce the synthesis gas is ground or pulverized to a desired particle size. The pulverized coal is heated by a drying stream to remove a portion of the moisture in the coal. The pulverized coal, after being separated from the drying stream, is then transported to a temporary storage location from where it is then conveyed to the gasifier to produce the synthesis gas; systems of this type are known as indirect or bin systems. Moisture is removed so that the pulverized coal does not agglomerate when stored in the bin. However, in removing the moisture, the drying stream itself retains moisture removed from the coal.

One current system uses a closed loop coal drying/grinding/transport gas of nitrogen with very low oxygen concentration, thus reducing the risk of coal combustion. Since the nitrogen is drying the coal, the moisture must be removed from the nitrogen by cooling it below the dew point, and removing the moisture, and then reheating it for recirculation to the pulverizer to dry and transport more coal. This system requires a cooler, a heater, associated pumps, valves and piping and continuous use of steam and cooling water. Since the nitrogen would have to be purchased, the coal preparation and drying system would be operated as a closed system in order to minimize nitrogen losses from the system, and one or more heat exchangers would be required to remove moisture from the recirculating nitrogen drying stream.

SUMMARY OF THE INVENTION

It is an object of the present invention to provide an improved method and apparatus for preparing coal for use in producing synthesis gas fuel used by gas turbines of power plants to produce electricity.

It is another object of the present invention to provide an improved method and apparatus for preparing coal for use in producing synthesis gas fuel which does not require a closed loop system.

It is a further object of the present invention to provide an improved method and apparatus for preparing coal for use in producing synthesis gas fuel which does not require heat exchangers to remove moisture from the drying stream.

Accordingly, one aspect of the present invention is drawn to an improved method and apparatus for preparing coal for use in producing synthesis gas which uses gas turbine exhaust gas to dry and convey pulverized coal from a pulverizer to a coal/gas separation device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

The sole FIGURE is a schematic drawing of the apparatus utilized in a preferred embodiment of the present invention.

DESCRIPTION OF THE PREFERRED EMBODIMENT

The FIGURE is a schematic illustration of a portion of an IGCC power plant, generally designated 10, which employs the principles of the present invention to prepare pulverized coal used in the production of synthesis gas to generate power. Synthesis gas 12 from a gasifier 90 and air 14 are combusted in gas turbine 16 to produce energy for the IGCC power plant 10. The gas turbine is coupled to an electric generator (not shown) which produces a portion of the electricity produced by IGCC plant 10. Hot turbine exhaust gas 18 is emitted from gas turbine 16 as a result of the combustion of the synthesis gas 12 and air 14. The hot turbine exhaust gas 18 is then conveyed to a $NO_x$ reduction device, such as a selective catalytic reduction (SCR) device 20, of known design and operation.

A portion 22 of the hot turbine exhaust gas 18 is then conveyed through a waste heat recovery boiler 40 of known design, while a second portion 24 of the hot turbine exhaust gas is directed to a coal pulverizer 60, as described below. The purpose of waste heat recovery boiler 40 is to generate steam to power a steam turbine and electric generator (not shown) for additional electric power generation by the IGCC plant 10. The temperature of the hot turbine exhaust gas flowing through the boiler 40 is reduced due to the heat transfer taking place within the boiler 40 and which produces the steam for the steam turbine (not shown). Cooled turbine exhaust gas exits from the boiler 40. Another portion 26 of the cooled turbine exhaust gas exiting from the boiler 40 is also directed to the coal pulverizer 60, as described below. The balance 28 of the cooled turbine exhaust gas exiting from the boiler 40 is then conveyed to an environmental clean up unit (schematically indicated at 110) of known design and thereafter to a boiler stack 120. The environmental clean up unit would actually be positioned so as to receive and treat the flow stream 28 and the gas exiting via line 7 from a coal/gas separation device 70 described below. The environmental clean up unit 110 may, for example, comprise wet or dry scrubbers of known design used to remove sulfur oxides from the turbine exhaust gas.

While the FIGURE illustrates a series arrangement of gas turbine 16, SCR 20 and waste heat recovery boiler 40, it will be appreciated by those skilled in the art that the SCR is probably integrated with the waste heat recovery boiler 40. Since the preferred inlet gas temperature entering the SCR 20 is about 700 F, it is likely that the designer would actually place some high temperature sections of the waste heat recovery boiler 40 in between the gas turbine 16 and the SCR 20, and then locate some low temperature sections of the waste heat recovery boiler 40 downstream of the SCR 20. In the present invention, it is preferred that the hot turbine exhaust gas 24, from which some of the $NO_x$ has been removed, be provided at a gas temperature of about 650 F, with the cooled turbine exhaust gas 26 exiting from the waste heat recovery boiler 40 at a gas temperature of about 300 F or less. This provides sufficient heat and cooling capability in the turbine exhaust gas for use as a drying agent in the coal pulverizer 60 as described below.

The hot 24 and cooled 26 turbine exhaust gas are conveyed to the coal pulverizer 60 to dry and convey pulverized coal from the pulverizer to a coal/gas separation device 70 in a controlled fashion, as described below. The turbine exhaust gas has a low oxygen concentration, reducing the risk of coal combustion.

Raw coal 30 is supplied to one or more coal pulverizers 60 and ground to a desired fineness to produce a stream of pulverized coal. The hot turbine exhaust gas 24 is mixed with the cooled turbine exhaust gas 26 at 32, and blown into the pulverizer 60 by hot pulverizer fan 50. The relative amounts of hot turbine gas 24 and cooled turbine gas 26 provided to the coal pulverizer 60 are regulated by motor operated gas dampers 34, 36 under the control of a controller (not shown) which operates to achieve a desired pulverized coal mill outlet temperature as measured by temperature sensor 38. The turbine exhaust gas dries the pulverized coal and transports it from the pulverizer 60. The dried pulverized coal exits from the pulverizer 60 and is conveyed to a coal/gas separation device 70, where the pulverized coal is separated from the gas. The mixed turbine exhaust gas which was conveyed to the coal pulverizer 34 removes the moisture from the pulverized coal. A direct fired-air heater (not shown) may be utilized to supply heat to the coal pulverizer exhaust gas input line if hot turbine exhaust gas is not available.

The coal/gas separation device 70 is advantageously a fabric filter, a cyclonic separation device, an electrostatic precipitator, or a combination thereof, and separates the pulverized coal from the turbine exhaust gas conveying stream. If device 70 is a fabric filter, it may be a single module, intermediate pressure, pulse-jet collector with automated cleaning of the filter bags in an on-line cleaning mode. The device 70 may include a pre-cleaner inlet to reduce the grain loading to the bags. Such a design provides for both separation of particles from the gas stream and reduces the gas stream velocity by introducing a cross-flow gas pattern into the side of the device 70. A compressed nitrogen system 100 may be provided for device 70 to provide nitrogen pulse jets to dislodge accumulated pulverized coal from the bags of the fabric filter. The nitrogen pulse jets also provide a nitrogen blanket over the pulverized coal to reduce the chance of combustion. Infiltration of air into the device 70 is also reduced by the positive pressure established by the hot pulverizer fan 50.

The pulverized coal separated from the exhaust gas in device 70 is collected in hoppers and then conveyed to pulverized coal storage bins 80 for eventual transport to the gasifier 90 where the synthesis gas is produced. The relatively clean exhaust gas is then conveyed from the coal/gas separator 70 to the environmental clean up unit 110 for final cleanup prior to discharge to the atmosphere.

The present invention may be employed in the construction of new IGCC power plants or in the repair, modification or retrofit of existing IGCC power plants. It is also understood that, depending upon the specific applications, certain features of the invention may be employed without other features of the invention. Thus, while a specific embodiment of the invention has been shown and described in detail to illustrate the application of the principles of the invention, it will be understood that the invention may be embodied otherwise without departing from such principles.

We claim:

1. A method for preparing coal for use in producing synthesis gas for use in gas turbines comprising the steps of:
    grinding coal in a pulverizer to produce pulverized coal;
    combusting synthesis gas with air in a gas turbine to produce hot turbine exhaust gas;
    conveying a first portion of the hot turbine exhaust gas to the coal pulverizer to dry and convey the pulverized coal from the pulverizer to a coal/gas separation device;
    conveying a second portion of the hot turbine exhaust gas through a waste heat recovery boiler to produce cooled turbine exhaust gas; and
    mixing the first portion of the turbine exhaust gas and the cooled turbine exhaust together and then conveying the mixture to the coal pulverizer.

2. The method according to claim 1, comprising the steps of:
    separating the pulverized coal from the turbine exhaust gas in the coal/gas separating device;
    conveying the separated pulverized coal from the coal/gas separation device to a pulverized coal storage bin; and
    conveying the turbine exhaust gas from the coal/gas separation device to an environmental clean-up unit.

3. A method for preparing coal for use in producing synthesis gas for use in gas turbines comprising the steps of:
    grinding coal in a pulverizer to produce pulverized coal;
    combusting synthesis gas with air in a gas turbine to produce hot turbine exhaust gas;
    conveying a first portion of the hot turbine exhaust gas to the coal pulverizer to dry and convey the pulverized coal from the pulverizer to a coal/gas separation device;
    conveying a second portion of the hot turbine exhaust gas through a waste heat recovery boiler to produce cooled turbine exhaust gas;
    mixing the first portion of the turbine exhaust gas and the cooled turbine exhaust together and then conveying the mixture to the coal pulverizer; and
    regulating the relative amounts of hot turbine exhaust gas and cooled turbine gas provided to the coal pulverizer to achieve a desired pulverized coal mill outlet temperature.

4. The method according to claim 3, comprising the steps of:
    separating the pulverized coal from the turbine exhaust gas in the coal/gas separating device;
    conveying the separated pulverized coal from the coal/gas separation device to a pulverized coal storage bin; and
    conveying the turbine exhaust gas from the coal/gas separation device to an environmental clean-up unit.

5. An apparatus for preparing coal for use in producing synthesis gas for use in gas turbines, comprising:
    a pulverizer for producing pulverized coal from raw coal;
    a gas turbine for combusting synthesis gas and air to produce hot turbine exhaust gas;
    a waste heat recovery boiler for receiving a first portion of the hot turbine exhaust gas to produce cooled turbine exhaust gas;
    dampers for regulating the relative amounts of hot turbine exhaust gas and cooled turbine gas provided to the coal pulverizer to achieve a desired pulverized coal mill outlet temperature;
    mixing point for mixing the first portion of the hot turbine exhaust gas and the cooled turbine exhaust together; and
    means for providing the mixture to the coal pulverizer to dry the pulverized coal and convey the pulverized coal from the coal pulverizer to a coal/gas separation device.

6. The apparatus according to claim 5, comprising:
    a fabric filter for receiving the pulverized coal and turbine exhaust gas from the coal pulverizer and separating the pulverized coal from the turbine exhaust gas.

* * * * *